No. 781,267. PATENTED JAN. 31, 1905.
L. A. CALLAHAN.
RAILWAY OR TRANSPORTATION TICKET.
APPLICATION FILED JULY 3, 1903.

Witnesses:
Bert Mason
M. Servert.

Louis A. Callahan, Inventor.
By Neuhart & Burkhart
Attorneys.

No. 781,267. PATENTED JAN. 31, 1905.
L. A. CALLAHAN.
RAILWAY OR TRANSPORTATION TICKET.
APPLICATION FILED JULY 3, 1903.

3 SHEETS—SHEET 2.

Fig. 3.

CAUTION - All persons are hereby notified that any one attempting to use this ticket, or by endorsing attached check by imitating the signature of the original purchaser, will render himself or herself liable to prosecution for FORGERY.

L. V. R. R. CO.
PHILA. TO

B. & O. R. R. CO.
WASHINGTON
TO
PHILA.

TRACER
– RETURN –

To be detached by Joint Agent and delivered to Conductor of train for which this ticket is stamped.
DESTINATION: V
Signed by Man – Woman
Good only on Train No. ......
Leaving AT ...... M ...... 1903.

In compliance with the Contract of this Ticket, I hereby subscribe my name as the Original Purchaser, and agree to leave on above mentioned train and date.

................................
Original Purchaser.
Witness:
................................
Agent.

Check Cashed – Not Cashed, by Joint Agent,

................................

Remarks: ................................
Baggage Check No. 417
This Tracer must be delivered to Conductor of first connecting Train.
Via ...................... R.R.

To PURCHASER
Read the Contract, and take notice that the return part of this ticket or tracer, before it will be honored for return passage, must be stamped and your signature witnessed.

Fig. 4.

by Joint Agent at Washington, D.C. on or before date of Final Return Limit.
Under all circumstances the forgoing Tracer must accompany this ticket when presented to Joint Agent for validation.

B. & O. R. R. CO.
PHILA.
TO
WASHINGTON.

L. V. R. R. CO.
V. To
PHILA.

TRACER
GOING

To be detached by Conductor of train for which ticket is stamped.
DESTINATION: Washington
Sold to MAN – WOMAN
Good only on Train No. ......
Leaving at ...... M ...... 1903.

This tracer must be delivered to Conductor of first connecting train, over designated road by conductor.

Remarks ................................
................................
................................

Via ...................... R.R.

Witnesses:
Bert Mason
M. Sewert.

Louis A. Callahan, Inventor.
By Neuhart & Burkhart
Attorneys.

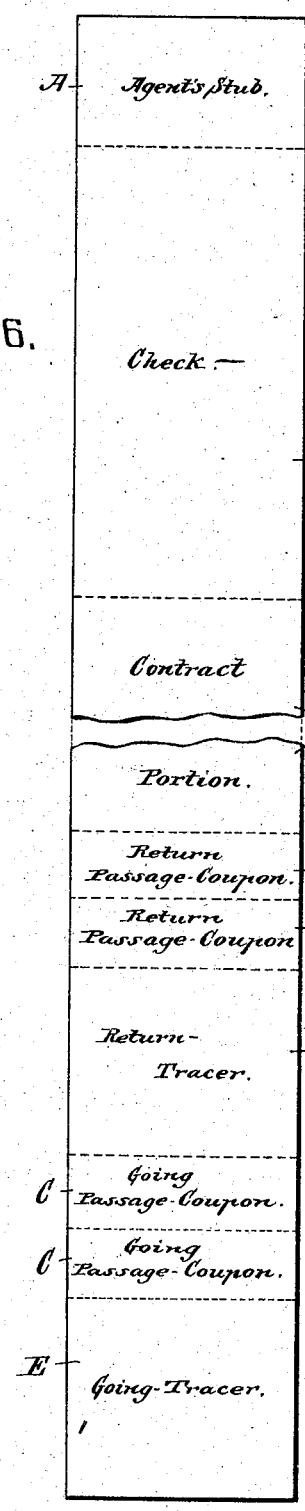

No. 781,267. Patented January 31, 1905.

UNITED STATES PATENT OFFICE.

LOUIS A. CALLAHAN, OF BUFFALO, NEW YORK, ASSIGNOR OF TWO-THIRDS TO JOHN FRANEY AND GEORGE HENRY, OF BUFFALO, NEW YORK.

RAILWAY OR TRANSPORTATION TICKET.

SPECIFICATION forming part of Letters Patent No. 781,267, dated January 31, 1905.

Application filed July 3, 1903. Serial No. 164,185.

*To all whom it may concern:*

Be it known that I, LOUIS A. CALLAHAN, a citizen of the United States, residing at Buffalo, in the county of Erie and State of New York, have invented certain new and useful Improvements in Railway or Transportation Tickets, of which the following is a specification.

This invention relates to railway, steamship, or similar transportation tickets, and more particularly to such as are issued for a return trip at a reduced rate.

The primary object of my invention is to provide a ticket whereby its use by any person other than the original purchaser can be easily detected and wherein provision is made to cause a wrongful holder to commit forgery or abandon his trip on such ticket by allowing the conductor or other authorized person to cancel the same.

Further objects are to provide a ticket with a negotiable rebate-check which can be cashed by the issuing ticket-office or by any bank, said check being also designed to be cashed at any time during the trip by any authorized person or by the agent authorized to validate the return portion of the ticket, said check when being cashed requiring indorsement by the payee, who should be the party designated on the face of the check, (the original purchaser,) and the acceptance of the rebate by any other party makes such party a forger against whom criminal action can be taken; to provide means for tracing the ticket during transit, whereby the passenger is compelled to travel on the first connecting train, if connection be necessary, and whereby the sale of tickets to ticket-brokers by employees of the transportation company is prevented, and also to prevent the sale of the return portion of the ticket to a ticket-broker by the use of the "return-tracer."

My invention is particularly applicable to reduced-rate or excursion return-tickets, but can be used in connection with any other style of ticket permitting its adaptation.

Heretofore reduced-rate return or excursion tickets have been issued requiring the validation of the return portion thereof by the joint agency or by the ticket agent of the road over which the start of the return trip is made by simply applying the agent's stamp to the rear side thereof, and therefore such tickets can be easily sold to a ticket-broker before or after validation, as no provision is made for detecting a ticket presented by a second party and no barrier is provided to prevent the use of a ticket after the same is validated. All of these objections and many other objections now found in reduced-rate return or excursion tickets I overcome by providing a negotiable check, a "going-tracer," and a "return-tracer" in addition to the usual contract and passage-coupons.

The invention in its preferred form is illustrated in the drawings, in which—

Figures 1 to 4 are face views of portions of the ticket divided to properly illustrate the same within the limits of the sheet, Figs. 1 and 4 showing the upper and lower ends, respectively, of the ticket, while Figs. 2 and 3 illustrate the intermediate portions. Fig. 5 is a rear view of the check portion of the ticket. Fig. 6 is a face view of a ticket, showing the various parts connected.

In describing the invention in detail we will assume its being used by a railroad company.

The ticket consists of the agent's stub A, which is retained by the issuing-office and which is designed to receive the signature of the purchaser, the usual contract portion B, which specifies the conditions under which the ticket is sold, the usual passage-coupons C, which are one or more for the going-trip and one or more for the return-trip, according to the number of roads over which the trip is made or the number of sections in a road.

Between the passage-coupons for going and those for returning a return-tracer D is provided. Below the going-passage coupons a going-tracer E is provided, and located between the agent's stub A and the contract is a negotiable rebate-check F. For convenience the various parts of the ticket are arranged as designated; but they may be otherwise arranged, if desired, or parts thereof may be omitted, as may be found desirable. Each portion of the ticket is provided with a number or with characters which correspond with the number or characters on every other portion of the ticket, whereby the parts can be conveniently compared and assembled.

In describing the use of the ticket we will suppose that a person wishes to go from a point V to Washington, D. C., upon the Lehigh Valley railway via the Baltimore and Ohio railway. He purchases a ticket at V, at which place the agent requests the purchaser to sign his or her name to the contract portion of the ticket, as is customary, which he then witnesses, and also to the agent's stub. The issuing agent will then make the check payable to the purchaser, and on the going-tracer he designates the sex of the purchaser, the destination, the number of the train on which the purchaser shall leave, and the time and date when he shall leave. The ticket is sold at a certain price and under certain conditions agreed to by the purchaser and the company issuing the ticket, one of the conditions being that the said company shall pay the purchaser a certain rebate designated on the check forming part of the ticket— say, for example, one dollar—or, in other words, shall cash the check for the amount designated thereon when he or she shall have fulfilled all the conditions agreed to, and another condition being that the said company shall have the right to pay such rebate at any time such ticket is presented for transportation or for validation. The check being negotiable can be cashed by the purchaser at the completion of a trip either at the office issuing the same or at any commercial bank. If the purchaser should decide to abandon his trip at any point, he may cash the company's check; but he can not make further use of the ticket, as the detachment of the check therefrom renders the same void. Upon presenting the ticket to the conductor he detaches the going-tracer and the passage-coupon directly above the said tracer, which entitles the passenger to the trip over the Lehigh Valley railway to Philadelphia. By means of the tracer he can determine whether the passenger is on the right train and may note any remarks which may have been written thereon by the agent. When Philadelphia is reached, the conductor delivers his tracers, or causes the same to be delivered, to the conductor of the connecting train, or to the conductor of the first train leaving for the destination over the Baltimore and Ohio railway, the connecting-road. This prevents the possibility of the passenger disposing of the balance of his ticket, as the same is only honored on the train or trains carrying the tracer, and there is nothing on the ticket to denote the train on which the tracer is. Therefore, even though sufficient time be allowed to sell the balance of the ticket to a ticket-broker before entering upon the second portion of the trip, the broker would not purchase the ticket, as he has no means of knowing on which train it would be honored, and the party who should desire to purchase a ticket from the ticket-broker would also refuse to purchase, since he not only must accept the broker's statement as truth, but he knows that the broker has no means of knowing on which train the corresponding tracer will be, except what information may have been imparted to him by the party selling the ticket. The slight saving in cost will not warrant the purchase of the ticket under the attendant difficulties and the further chance of committing forgery should the trip be continued after starting, as will be hereinafter explained. On continuing the trip from Philadelphia to Washington over the Baltimore and Ohio railway the conductor of the train will take up the passage-coupon for that portion of the going-trip and will compare the same with the corresponding tracer, which he is in possession of. Should he find that he has no tracer to correspond to the number and destination of the passage-coupon and he is satisfied that the party presenting the ticket is not the original purchaser, he can take up the ticket, and should he, even though in possession of the corresponding "tracer," for any reason believe that the party presenting the ticket is not the original purchaser he can cash the check and request the traveler to indorse the same, which he must necessarily do by signing the name of the party mentioned on the face of the check to whom the same is payable, which, if not his own name, would make him liable for receiving money by forging another party's name. When the conductor cashes a check on the going portion of the trip, he will forward the same to the joint agency or the ticket agent at the point of destination, who will note the same, and when the return portion of the ticket is presented for validation without the check he will refer to his memorandum to ascertain whether the check has been cashed, and, if so, will validate the ticket. If the ticket is presented to the conductor by the original purchaser, he reaches his destination with the negotiable check still attached to the ticket, and the return-tracer at the bottom of the same, all portions below the return-tracer having been detached on the going portion of the trip. The ticket, like all return-tickets, is limited to a certain period at or before the expiration of which the return-trip must be entered upon. The limit may be punched, marked, or otherwise noted upon the ticket, as may be desired.

Before entering upon the return trip the ticket must be validated at the joint agency, such as may be established by the passenger association of which the connecting roads are members or by the ticket-agent of the road over which the return trip is started. The agent validates the ticket by applying his stamp; but before doing so he requests the party presenting the same to sign his name on the return-tracer, which can be compared with the signature beneath the contract. If the agent has any doubt about the party presenting the ticket being the original purchaser of the same, he may cash the company's rebate-check, if not already cashed, and request the party to indorse the same, which indorsement and receipt of the money would be forgery should the party receiving the money not be the original purchaser. If, however, the agent is of the opinion that the party presenting the ticket for validation is the original purchaser, he does not cash the check. At the same time the agent designates on the return-tracer the destination, the sex of the party, the number of the train, and the time the train leaves, and under "Remarks" the number of the baggage-check and other matter may be inserted, all of which may aid in detecting irregular travel. The agent then detaches the return-tracer and forwards the same to the conductor of the train designated thereon, and the trip must therefore be made on the said train. The lower passage-coupon is detached by the conductor on that portion of the trip from Washington to Philadelphia after he has determined that the ticket corresponds with one of the tracers forwarded to him, and he in turn, on arrival at Philadelphia, forwards the tracer to the conductor of the train on the connecting road, (the Lehigh Valley railroad,) and the passenger must therefore continue his trip on the connecting train or on the first train leaving the connecting-point. During the return trip any conductor or other authorized person may exercise the right to cash the rebate-check, if not already cashed, should he for any reason believe that the traveler is not the original purchaser. After the trip is completed and the rebate-check has not been cashed by an authorized person the passenger may cash the same at the issuing ticket-office or at any bank. When cashed at or deposited in a bank, it is handled like all other checks, being in every respect a common negotiable check and is passed through the clearing-house in the usual manner.

By the use of the return-tracer the sale of the return portion of a ticket to a ticket-broker is prevented. The ticket is not salable, for the reason that the party purchasing the ticket from the broker is compelled to sign the return-tracer and the signature must correspond with the signature beneath the contract, and should the signature vary in any particular the agent will exercise the right to demand an indorsement of the check and pay the party presenting the ticket the amount stated on the face thereof. A party who is not the original purchaser will not indorse the check and receive money by forging the signature of another, knowing that such an act is a criminal offence, and his refusal will of necessity render the ticket void, which the agent will then retain and cancel.

An attempt to have the ticket validated before disposing of the same to a broker will compel the broker to accept the statement of the seller as to the number of the train and time of departure without any evidence as to the truth of the same, as the agent on validating the ticket detaches the return-tracer, which is the only portion of the ticket having the information, and forwards the same to the conductor of the train designated thereon. A prospective purchaser will not accept the statement of the broker regarding the number of the train designated on the detached return-tracer or the time of departure of such train, particularly since he knows that the latter has no positive means of knowing, and consequently the broker will not purchase unsalable tickets. Furthermore, the conductor is a barrier and may exercise his right to cash the check if not already cashed, and a person purchasing a ticket of this kind from a ticket-broker will invariably be detected in the attempt to travel on another person's ticket.

The signing of the agent's stub by the purchaser is an additional safeguard to prevent the sale of the return portion of the ticket to a broker, who might otherwise purchase the ticket for a small amount above the value of the check or for at least the amount called for on the check and if impossible to sell the ticket within the time limit would destroy the contract portion and coupons, indorse the check, and cash the same at a bank. With the signature of the purchaser on the agent's stub, however, the indorsement can be compared when the check enters the office of the auditor of the road, and the indorser, if not the original purchaser of the ticket, can be traced and prosecuted.

When the destination of the return trip is designated on the last passage-coupon of such trip, which may or may not be the starting-point, the ticket is used as above described; but I provide an additional safeguard by omitting the destination of the return trip from such coupon, as shown in the drawings. In such cases the destination of the return portion of the trip, which is generally the starting-point, must be noted upon the return-tracer at the issuing office, and provision can be made to compel a party to check his baggage, if any, before having the return portion of the ticket validated, as the passage coupon or coupons do not disclose the destination and the baggageman would have no means of determining to what point the baggage may be checked should the return-tracer be detached. It furthermore compels the passenger to identify himself by the baggage-check in addition to identification by signature should the agent so desire, and after validation and detachment of the return-tracer by the agent the ticket is not salable, as there is no destination on the coupons and it would be impossible to determine what the destination is. Furthermore, it provides means whereby the conductor may easily determine if the passenger traveling on the ticket is the original purchaser, as he is in possession of the corresponding tracer bearing the destination and may wish to ascertain if the passenger knows what the destination is.

The original purchaser will of course know when he reaches his destination; but a wrongful holder of the ticket can only depend on what the ticket-broker says, who must receive his information from the original purchaser without any evidence to prove the statement made by him.

It is to be noted that the passage portion of the ticket, whether regular or in the form of a pass, can be used with any of the other portions of the ticket, and in some instances the use of the rebate-check in connection with the pass is very desirable.

It is obvious that this ticket can be used on one road or that it can be extended to embrace more than two roads; but I have shown and described its use as applied to two connecting roads.

Having thus described my invention, what I claim is—

1. A railway-ticket bearing the signature of the purchaser and comprising a passage portion, a contract portion, and a check made payable to the order of the purchaser or intended user.

2. A railway-ticket comprising a passage portion and bearing the name of the purchaser, and a check made payable to the order of the purchaser and being connected to said passage portion, substantially as set forth.

3. A railway-ticket bearing the signature of the purchaser on some part thereof and having a passage portion, and a contract portion embodying conditions whereby the purchaser is to receive a rebate on his completing the trip and whereby the user of the ticket is required to accept said rebate at any time during transit at the option of the transportation company and whereby the user is also required to receipt by signature for said rebate.

4. A railway-ticket comprising a passage portion and bearing the name of the purchaser, and a check made payable to the order of the purchaser and having an appropriately-designated signature-blank for the signature of the payee.

5. A railway-ticket bearing the purchaser's signature on some part thereof and having a passage portion, and a connected check made payable to the order of the purchaser, both the check and the passage portion having corresponding identification characters.

6. A railway-ticket comprising a passage portion and bearing the name of the purchaser, and a check made payable to the purchaser and being separated from said passage portion by a weakened line.

7. A railway-ticket comprising a passage portion, and a "tracer-coupon" connected thereto and bearing inscription directing the ticket or joint agent to detach the same and deliver to the conductor of the train on which the ticket is to be used, as and for the purpose described.

8. A railway-ticket having a passage portion, and a "tracer-coupon" connected to said passage portion and bearing inscription directing the ticket or joint agent to detach said "tracer-coupon" from the passage portion and deliver the same to the conductor of the outgoing train, said "tracer-coupon" bearing also inscription directing the conductor of the outgoing train to deliver said "tracer-coupon" to the conductor of a connecting train, as and for the purpose described.

9. A railway-ticket bearing the purchaser's signature on some part thereof and comprising going and return passage coupons and a return "tracer-coupon" bearing inscription directing the ticket or joint agent to detach the same and deliver to the conductor of the outgoing return-train, said "tracer-coupon" having also an appropriately-designated purchaser's-signature blank thereon, substantially as set forth.

10. A railway-ticket bearing the purchaser's signature on some part thereof and comprising going and return passage coupons and a return "tracer-coupon" bearing inscription directing the ticket or joint agent to detach the same and deliver to the conductor of the outgoing return-train, said "tracer-coupon" having also an appropriately-designated purchaser's-signature blank and inscription directing the conductor of the outgoing return-train to deliver the same to the conductor of the connecting train, as and for the purpose described.

11. A railway-ticket comprising a contract portion, going and return passage coupons, a going "tracer-coupon," and a return "tracer-coupon," both "tracer-coupons" having inscription directing the "tracer-coupons" to be delivered to the successive officials validating the ticket and accepting the passage-coupons for travel.

12. A railway-ticket bearing the purchaser's signature and comprising a passage portion, a check, and a "tracer-coupon," bearing inscription directing the ticket or joint agent to deliver the said "tracer-coupon" to the conductor of the outgoing train, as and for the purpose described.

13. A railway-ticket comprising a passage portion, a check connected thereto and having an appropriately-designated signature-blank to receive the indorsement of the traveler, and a contract portion having conditions noted thereon allowing any authorized official of the transportation company issuing the ticket or any authorized official of any coöperating company to cash said check at any time and at any point in transit, as and for the purpose set forth.

14. A railway-ticket comprising a passage portion, a check, and a contract portion having conditions noted thereon allowing the drawer or any authorized party thereof to cash said check at any time and at any point in transit, said check having also inscription thereon noting that the payment of the same is made in consideration of the original purchaser having complied with the conditions in the said contract portion of the ticket, as and for the purpose set forth.

15. A railway-ticket comprising a passage portion, and a connected check drawn by the company issuing said ticket and made payable to the purchaser, said check having an appropriately-designated purchaser's-signature blank to receive the endorsement of the traveler, as and for the purpose described.

16. A railway-ticket comprising a passage portion, a connected check, a contract portion bearing inscription providing for the payment of said check on completion of the trip or at any time or place during transit at the option of the drawer, said check bearing inscription thereon noting that payment is to be made in consideration of the purchaser having complied with the conditions in the said contract portion of the ticket, substantially as set forth.

17. A railway-ticket comprising a going-passage coupon, a return-passage coupon having the place of destination omitted, a going "tracer-coupon," and a return "tracer-coupon," bearing the place of destination, said going "tracer-coupon" having inscription directing the conductor of the train leaving the starting-point to deliver the same to the conductor of the connecting train and the return "tracer-coupon" having inscription directing the ticket or joint agent to detach and deliver the same to the conductor of the outgoing return-train, as and for the purpose described.

18. A railway-ticket having a contract portion at its upper end, a return-passage portion directly beneath said contract portion, a return "tracer-coupon" beneath said return-passage portion, a going-passage portion beneath said return "tracer-coupon," and a going "tracer-coupon" beneath said going-passage portion, said "tracer-coupons" having each inscription thereon denoting its use during transit to trace their respective passage portions of the ticket, and the return "tracer-coupon" having additional inscription requiring its detachment by the ticket or joint agent to be forwarded by him to the conductor of the outgoing train, as and for the purpose described.

19. A railway-ticket comprising a passage portion and a "tracer-coupon," both having corresponding indentifying characters and the "tracer-coupon" having inscription thereon directing the ticket or joint agent to deliver the same to the conductor of the train on which said passage portion is to be used, as and for the purpose described.

20. A railway-ticket bearing the purchaser's signature on some part thereof and having a passage portion, and a connected check made payable to the order of the purchaser, both the check and the passage portion having corresponding identification characters and the said check having an appropriately-designated signature-blank on its rear face.

21. A railway-ticket bearing the signature of the intended user and comprising a passage portion and a check made payable to the order of the intended user, said check and passage portion being connected.

In testimony whereof I have affixed my signature in the presence of two subscribing witnesses.

LOUIS A. CALLAHAN.

Witnesses:
EMIL NEUHART,
CHAS. F. BURKHART.